G. M. HOAG.
Potato Digger.
No. 109,211.  Patented Nov. 15, 1870.
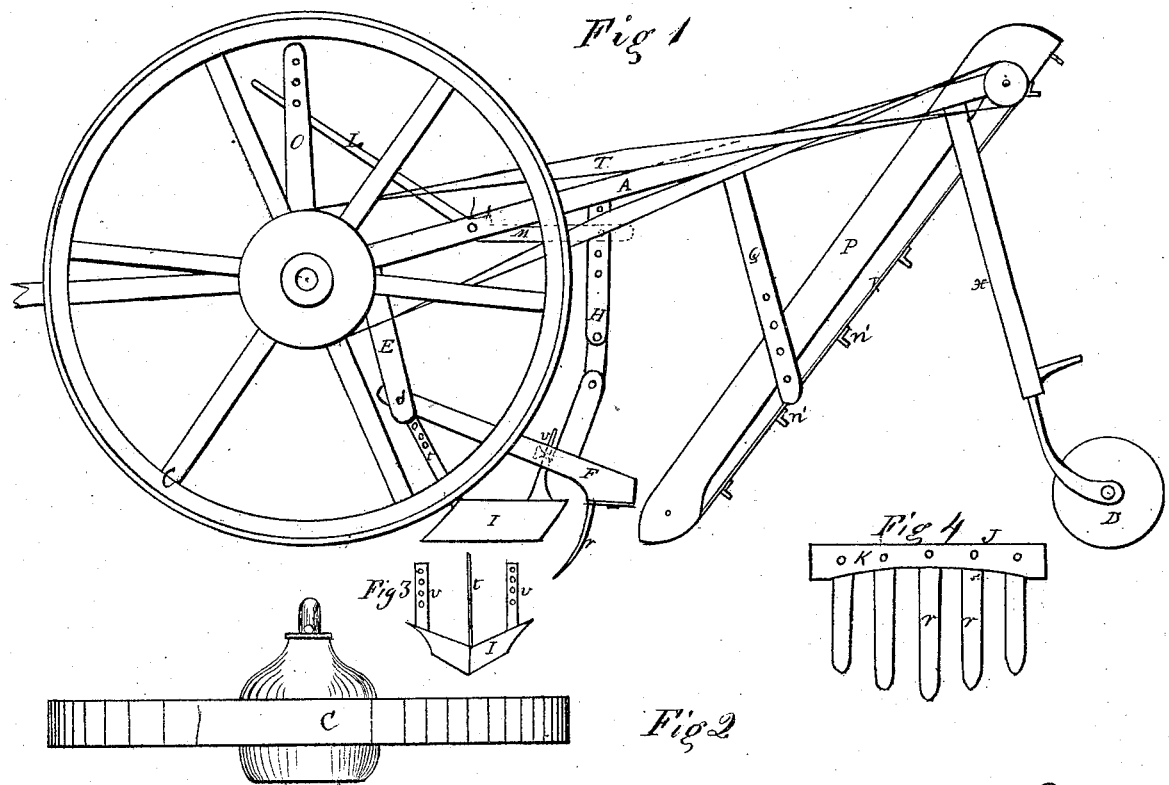
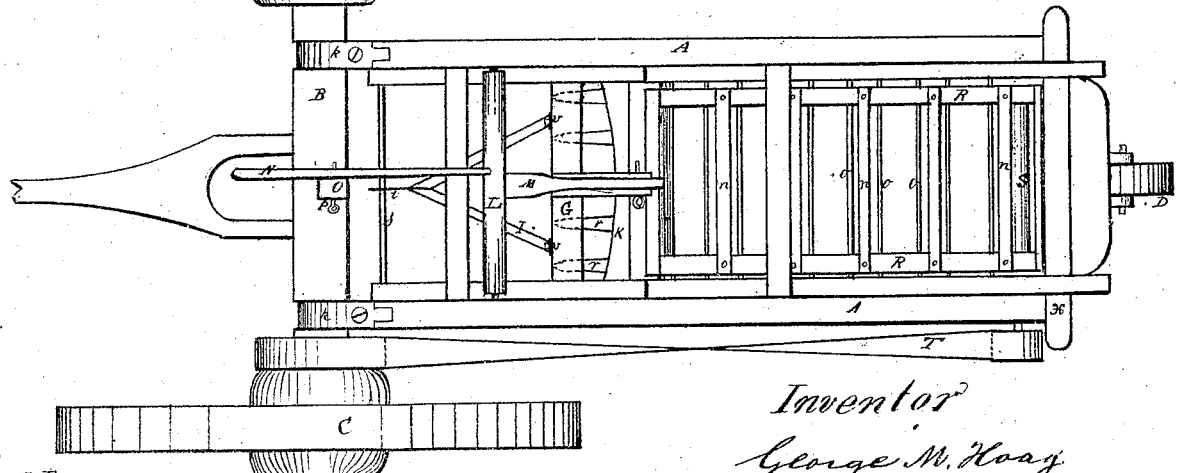
Witnesses.
Inventor
George M. Hoag
By his Atty. J. Dennis Jr.

United States Patent Office.

GEORGE M. HOAG, OF MUSCATINE, IOWA.

Letters Patent No. 109,211, dated November 15, 1870.

IMPROVEMENT IN POTATO-DIGGERS.

The Schedule referred to in these Letters Patent and making part of the same.

*To all whom it may concern:*

Be it known that I, GEORGE M. HOAG, of Muscatine city and county, and in the State of Iowa, have invented certain new and useful Improvements in a Potato-Digger and Picker; and I hereby declare the following to be a full and exact description thereof, reference being had to the accompanying drawing forming part of this specification.

The nature or essence of my invention consists in providing a scraper for removing the vines and weeds, a pronged digger for taking the potatoes out of the ground, and an endless carrier and screen for removing the dirt and raising the potatoes for delivery into a proper receptacle, and in the combination of these, and the arrangement and operation of the several parts, as will be fully set forth below.

In the drawing—

Figure 1 is a side elevation;

Figure 2, a top view; and

Figures 3 and 4 show particular parts.

The main frame, A, is connected to the axle B of the wheels C by straps $k$, passing around it and secured upon the frame, so as to allow the rear end (supported by the wheel D, pivoted beneath the depending frame X) to adapt itself to any unevenness of the ground.

Under the frame A, and pivoted upon the standards E, is a swinging frame, consisting of the side bars F, cross-bar G, and vertical jointed bar H.

The scraper I, resembling in shape a double mold-board, (see fig. 3,) is suspended from the cross-bar G by the straps $v$, provided with several holes for adjusting the scraper at the proper height, the front end being connected by a similar adjustable strap, $t$, to the rod $s$, by which the bars F are hung upon the standards E.

The pronged digger J is fastened upon the under side of the rear ends of the bars F.

It consists of a head-plate, K, (see fig. 4,) provided with a number of flat prongs or tines, $r$, which may be made from one and a half to two inches wide, and from one inch to an inch and three-quarters apart.

The rock-shaft L has its bearings in the frame A, and has upon it the arm M, pivoted, at its outer end, to the jointed bar H.

The shaft L is turned by the hand-lever N, held at a higher or lower point by a pin, $p$, in the standard O upon the axle B.

By raising or lowering the outer end of the lever the jointed bar H will be lowered or raised by the arm M, and the scraper I and digger J elevated or depressed at will.

The carrier-frame P has its upper end supported by the rear end of the frame A, and its lower part by the standards Q, depending from the same.

Rods $o$ extend across it at short intervals, and strips of metal, (or other suitable material,) bent at right angles, as shown at $n'$, and having their ends fastened upon the endless belts R, are carried along over this screen by the roller S at the upper end of the frame, these belts passing also over a roller at the lower end of the frame P.

The roller S is turned by the belt T, operated by a pulley on the hub of the wheel C.

The standard Q should be pierced with several holes, in order that the lower end of the carrier-frame may be adjusted properly to the position of the digger J.

Operation.

The scraper I being so adjusted as to take off the top surface of the ground and remove the weeds and vines from the potato row, the digger J follows it, and, being arranged to penetrate as deep as the lowest potatoes are supposed to lie, it takes them out of the ground by its inclined position, and they are crowded over the top of the head-plate K as the machine advances. From this they fall upon the screen formed by the rods or wires $o$, arranged to receive them, and are carried up the same by the strips $n$ on the belts R, the dirt, in the meantime, falling off and through the screen. At the top they fall over into a bag, basket, or other proper receptacle that may be suspended there to receive them.

The foregoing being a description of my improvements in potato-diggers,

I claim as of my invention the following:

1. The combination and arrangement of the scraper I, pronged digger J, and the endless carrier, formed by the belts R, strips $n$, and rods $o$, when united for joint operation, substantially as herein set forth.

2. The arrangement of the carrier-frame P, whereby its lower end may be adjusted to a higher or lower position, independently of the digger J, substantially as specified.

3. Hanging the scraper I, for removing the potato-vines, so that it can be adjusted higher or lower, independently of the pronged digger, substantially as described.

GEO. M. HOAG.

Witnesses:
J. DENNIS,
WM. DENNIS.